United States Patent Office 3,427,319
Patented Feb. 11, 1969

3,427,319
BENZIMIDAZOLINONES
Aubert Yaucher Coran, Creve Coeur, Mo., and Joseph
  Edward Kerwood, St. Albans, W. Va., assignors to
  Monsanto Company, St. Louis, Mo., a corporation of
  Delaware
No Drawing. Continuation-in-part of three applications
  Ser. No. 579,493, Sept. 15, 1966; Ser. No. 549,730,
  May 12, 1966; Ser. No. 459,466, May 27, 1965. This
  application Jan. 8, 1968, Ser. No. 696,104
U.S. Cl. 260—309.2                                    14 Claims
Int. Cl. C07c 49/34; A61k 27/00

ABSTRACT OF THE DISCLOSURE

Sulfenamides characterized by the formula

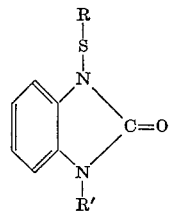

where R is alkyl, aryl, cycloalkyl, and R' is hydrogen, alkylthio, arylthio, or cycloalkylthio, are new compounds which inhibit premature vulcanization of vulcanizable elastometers.

Cross references to related applications

This application is a continuation-in-part of application Ser. No. 579,493 filed Sept. 15, 1966, now abandoned, a continuation-in-part of the application Ser. No. 549,730 filed May 12, 1966, and a continuation-in-part of the application Ser. No. 459,466 filed May 27, 1965, now abandoned.

Background of the invention

The invention relates to new compounds useful as inhibitors of premature vulcanization in rubber.

In the manufacture of vulcanized rubber products, crude rubber is combined with various other ingredients such as fillers, accelerators, and antidegradants to alter and improve processing of the rubber and to improve the properties of the final product. The crude rubber is put through several steps in the plant before it is ready for the final step of vulcanization. Generally the rubber is mixed with carbon black and other ingredients except the vulcanizing agent and accelerator. Then the vulcanizing and accelerating agents are added to this masterbatch in a Banbury mixer or a mill. Scorching, viz, premature vulcanization, can occur at this stage of the processing, during the storage period before vulcanizing, and during the actual vulcanization. After the vulcanizing and accelerating agents are added, the mixture of crude rubber is ready for calendering or extruding and vulcanization. If premature vulcanization occurs during the storage of the crude mixture or during processing prior to vulcanization, the processing operations cannot be carried out because the scorched rubber is rough and lumpy, consequently useless. Premature vulcanization is a major problem in the rubber industry and must be prevented in order to allow the rubber mix to be preformed and shaped before it is cured or vulcanized.

There are several reasons offered for premature vulcanization. The discovery of the thiazolesulfenamide accelerators constituted a major breakthrough in the vulcanization art because thiazolesulfenamides delayed onset of the vulcanizing process, but once it started the built-in amine activation of the thiazole resulted in strong, rapid curing. Mercaptobenzothiazole is a valuable organic vulcanization accelerator but by present standards would be considered scorchy. It has been largely replaced by the delayed-action accelerators, but further improvement has eluded the art. The development of high pH furnace blacks which lack the inherent inhibiting effect of the acidic channel blacks and the popularity of certain phenylenediamine antidegradants which promote scorching have placed increasingly stringent demands on the accelerator system.

Retarders have long been available to rubber compounders. These include N-nitrosodiphenylamine, salicyclic acid, and a terpene-resin acid blend. See Editors of Rubber World, "Compounding Ingredients for Rubber," 91–94 (3rd Ed., 1961). Acids as retarders are generally ineffective with thiazolesulfenamide accelerators or adversely affect this vulcanizing process. Nitrosoamines as retarders are only of limited effectiveness with thiazolesulfenamides derived from primary amines. Certain sulfenamides which are not accelerators per se have been shown to retard mercaptobenzothiazole and other scorchy accelerators, but the effect on another sulfenamide incorporated as the primary accelerator has been marginal. Similarly, mixtures of accelerating sulfenamides have been proposed as a means of improving processing safety, but neither of these innovations has significantly improved a good delayed-action accelerator.

Summary of the invention

We have discovered a class of sulfenamides which are extremely valuable inhibitors of premature vulcanization. These are characterized by the presence of a carbonyl group adjacent to the sulfenamide nitrogen. The characteristic nucleus is

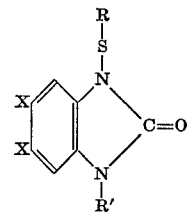

where R is alkyl, aryl, cycloalkyl, and R is hydrogen, alkylthio, arylthio, or cycloalkylthio. Aryl is used in the usual generic sense to mean any univalent organic radical where free valence belongs to an aromatic carbocyclic nucleus and not to a side chain. The term includes radicals substituted in the carbocyclic nucleus, for example, by alkyl, alkoxy, nitro, chloro, bromo, fluoro, iodo, and hydroxy. It is preferred that the carbocyclic nucleus contain not more than one electronegative substituent. Alkyl is used in the alkylhydrocarbon sense to mean unsubstituted aliphatic radicals of the series $C_nH_{2n+1}$. Primary, secondary, and tertiary alkyls are included, for example, straight or branched chains, a sub-group of which are alkyls of 3 to 12 carbon atoms. However, primary and secondary alkyl hydrocarbons of 1 to 18 carbon atoms are the preferred alkyl compounds of this invention. The term cycloalkyl includes cycloalkyl radicals of 5 to 12 carbon atoms in the ring to which the sub-group of 5 to 8 carbon atoms belongs. X can be hydrogen, alkyl, halogen, nitro, alkoxy, or hydroxy. A combination of an accelerator and an inhibitor of this invention is an improved rubber additive which allows longer and safer processing time for rubber.

An object of this invention is to promote the progress of science and useful arts. An object of this invention is to provide a method to effective prevent the premature vulcanization of rubber. A further object of this invention is to provide new chemical compounds useful as premature vulcanization inhibitors especially with delayed-action thiazolesulfenamides. A further object of this invention is to provide a method for a faster rate of cure for vulcanizable rubber without premature vulcanization. A further object of this invention is to provide a method to increase the available processing time prior to the actual vulcanization of rubber. A further object of this invention is to provide a method to prevent the premature vulcanization of crude rubber in storage containing a vulcanizing and accelerating agent. A further object of this invention is to provide a method to prevent the premature vulcanization of rubber during the actual vulcanization step. A further object of this invention is to prevent the premature vulcanization of rubber at any time. A further object of this invention is to provide a safer method for processing and vulcanizing rubber. A further object of this invention is to provide a stabilizer for rubber. A further object of this invention is to provide new and improved vulcanized rubber products. A further object of this invention is to provide a vulcanized rubber stock in which the rate of reversion is reduced. Other objects of the invention will be come apparent as the description of our invention proceeds. These objects are accomplished by using a sulfenamide derived from an amide or imide in the processing of rubber.

Preferred embodiments

Our invention is that compounds having the formula

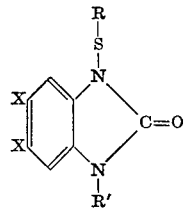

are excellent premature vulcanization inhibitors for a vulcanizable diene rubber where R is alkyl, aryl, or cycloalkyl, and R' is hydrogen, alkylthio, arylthio, or cycloalkylthio. More specific examples of R are methyl, ethyl, propyl, isopropyl, butyl, amyl, t-butyl, phenyl, benzyl, chlorophenyl, nitrophenyl, tolyl, naphthyl, cyclooctyl, cyclohexyl, cyclopentyl, and cyclododecyl. X is hydrogen, alkyl, halogen, nitro, alkoxy, or hydroxy.

Examples of the new compounds of the invention are 1,3-bis(cyclohexylthio)-2-benzimidazolinone,
1,3-bis(cyclooctylthio)-2-benzimidazolinone,
1,3-bis(cyclopentylthio)-2-benzimidazolinone,
1,3-bis(cyclododecylthio)-2-benzimidazolinone,
1,3-bis(phenylthio)-2-benzimidazolinone,
1,3-bis(tolylthio)-2-benzimidazolinone, and mixtures thereof, 1,3-bis(m-tolylthio)-2-benzimidazolinone,
1-phenylthio-2-benzimidazolinone,
1-benzylthio-2-benzimidazolinone,
1-chlorophenylthio-2-benzimidazolinone,
1-nitrophenylthio-2-benzimidazolinone,
1-cyclohexylthio-2-benzimidazolinone,
1-cyclooctylthio-2-benzimidazolinone,
1-cyclopentylthio-2-benzimidazolinone,
1-tolylthio-2-benzimidazolinone,
1-t-butylthio-2-benzimidazolinone,
1-methylthio-2-benzimidazolinone,
1-ethylthio-2-benzimidazolinone,
1-propylthio-2-benzimidazolinone,
1-isopropylthio-2-benzimidazolinone,
1,3-bis(chlorophenylthio)-2-benzimidazolinone,
1,3-bis(benzylthio)-2-benzimidazolinone,
1,3-bis(nitrophenylthio)-2-benzimidazolinone,
1,3-bis(t-butylthio)-2-benzimidazolinone,
1,3-bis(propylthio)-2-benzimidazolinone,
1,3-bis(methylthio)-2-benzimidazolinone,
1,3-bis(ethylthio)-2-benzimidazolinone,
1,3-bis(isopropylthio)-2-benzimidazolinone,
1,3-bis(n-dodecylthio)-2-benzimidazolinone, and
1-cyclododecylthio-2-benzimidazolinone.

Rubber stocks containing delayed-action accelerators can be used in the process of this invention. Cheaper, more scorchy accelerators can also be used with an excellent degree of improvement. The improved vulcanizing process of this invention can be used advantageously to process stocks containing furnace blacks as well as stocks containing other types of blacks and fillers used in rubber compounding. The invention is also applicable to gum stocks.

Our invention is applicable to rubber mixes containing sulfur-vulcanizing agents, peroxide-vulcanizing agents, organic accelerators for vulcanization, and antidegradants, neither being the inhibitor used. For the purposes of this invention, sulfur-vulcanizing agent means elemental sulfur or sulfur containing vulcanizing agent, for example, an amine disulfide or a polymeric polysulfide. The invention is applicable to vulcanization accelarators of various classes. For example, rubber mixes containing the aromatic thiazole accelerators which include benzothiazyl-2-monocyclohexyl sulfenamide, 2 - mercaptobenzothiazole, N - tert - butyl-2-benzothiazole sulfenamide, 2-benzothiazolyl diethyldithiocarbamate, and 2 - (morpholinothio)benzothiazole can be used. Amine salts of mercaptobenzothiazole accelerators, for example, the t-butylamine salt of mercaptobenzothiazole, like salts of morpholine, and 2,6-dimethyl morpholine, can be used in the invention. Thiazole accelerators other than aromatics can be used. Stocks containing accelerators, for example, the tetramethylthiuram disulfide, tetramethylthiuram monosulfide, aldehyde amine condensation products, thiocarbamylsulfenamides, thioureas, xanthates, and guanidine derivatives, are substantially improved using the process of our invention. Examples of thiocarbamylsulfenamid accelerators are shown in U.S. Patents 2,381,-393, Smith assigned to Firestone, 2,388,236, Cooper assigned to Monsanto, 2,424,921, Smith assigned to Firestone, and British Patent 880,912, Dodson, assigned to Imperial Chemical Industries Limited. The invention is applicable to accelerator mixtures. The invention is applicable to stocks containing amine antidegradants. Rubber mixes containing antidegradants, for example, N-1,3-dimethylbutyl - N' - phenyl-p-phenylenediamine, N,N'-bis(1,4 - dimethylpentyl)-p-phenylenediamines, ketone, ether, and hydroxy antidegradants and mixtures thereof, are substantially improved using the process of our invention. Mixtures of antidegradants, for example, a mixture of N-1,3-dimethylbutyl-N'-phenyl-p-phenylenediamine and N,N'-bis(1,4-dimethylpentyl)-p-phenylenediamine, furnish a much improved final product when used with the inhibitors of this invention.

The inhibitors of our invention can be used in natural and synthetic rubbers and mixtures thereof. Synthetic rubbers than can be improved by the process of this invention include cis-4-polybutadiene, butyl rubber, ethylene-propylene terpolymers, polymers of 1,3-butadiene, for example, 1,3-butadiene itself and of isoprene, copolymers of 1,3-butadiene with other monomers, for example, styrene, acrylonitrile, isobutylene, and methyl methacrylate. The invention relates to diene rubbers, and the terms rubber and diene rubber are synonymous for the purpose of this invention.

The new compounds of this invention are prepared as follows:

1,3-bis(phenylthio)-2-benzimidazolinone is prepared in the following manner: 28.8 grams (0.2 mole) of benzene sulfenyl chloride dissolved in 31.2 grams of $CCl_4$ is added in one portion to a well-stirred solution of 13.4 grams (0.1 mole) of 2-hydroxybenzimidazole dissolved in 250 ml. of DMF cooled to 0° C. The temperature is maintained between 0° to 5° C. by cooling with an external acetone/ice bath. To the resulting solution over a 15-minute period is added slowly 25.0 grams (0.25 mole) of triethylamine. Upon addition of all the amine, the resulting reddish slurry is transferred to a 4.0 liter beaker with vigorous stirring, and the reaction is quenched by the addition of 3.0 liters of ice water. The amine salt is dissolved and a thick viscous oil results. After decanting the water away from the oil layer, the latter solidifies to give a red solid. This material is recrystallized from ethyl acetate to yield 15.0 grams of a white solid, melting point 115°–117° C. The infrared spectrum is consistent with the proposed structure. Analysis of the product shows 7.98% nitrogen and 18.12% sulfur. Calculated percentages for $C_{19}H_{14}N_2OS_2$ are 7.98% nitrogen and 18.39% sulfur.

The reaction product of 2-hydroxybenzimidazole with the sulfenyl chloride from mixed thiocresols is prepared in the same manner as the 1,3-bis(phenylthio)-2-benzimidazolinone. The semi-solid obtained is recrystallized from ethanol to give 15.0 grams of a cream solid which melts from 115.5°–125° C. The infrared spectrum is consistent with the proposed structure. Analysis of this product shows 6.94% nitrogen and 16.40% sulfur. Calculated percentages for $C_{21}H_{18}N_2OS_2$ are 7.44% nitrogen and 16.97% sulfur. 1,3 - bis(chlorophenylthio) - 2 - benzimidazolinone, 1,3 - bis(benzylthio)-2-benzimidazolinone, 1,3 - bis(nitrophenylthio) - 2 - benzimidazolinone, 1,3-bis(t - butylthio) - 2 - benzimidazolinone, 1,3 - bis(m-tolylthio)-2-benzimidazolinone, and other compounds of this invention are prepared in the same manner as the 1,3 - bis(phenylthio) - 2 - benzimidazolinone described above. The mono-substituted compounds such as 1-phenylthio-2-benzimidazolinone are also prepared in the same manner except less sulfenyl chloride or an excess of 2-hydroxybenzimidazole is used.

The following tables illustrate the invention in greater detail and the best mode for carrying it out, but are not to be construed as to narrow the scope of our invention. For all the rubber stocks tested and described, infra, as illustrative of the invention, Mooney scorch times at 121° C. and 135° C. are determined by means of a Mooney plastometer. The time in minutes $(t_5)$ required for the Mooney reading to rise five points above the minimum viscosity is recorded. Longer times are indicative of the activity of the inhibitor. Longer times on the Mooney Scorch Test are desirable because this indicates greater processing safety. Percentage increases in scorch delay are calculated by dividing the Mooney scorch time of the stock containing the premature vulcanization inhibitor by the Mooney scorch time of the control stock, multiplying by 100, and subtracting 100. These increases show the percentage improvement in scorch delay over the control stock which contains no inhibitor. Additionally, cure ratings are calculated from the time required to cure the stocks at 144° C., and in some cases 153° C. Curing characteristics are determined by means of the Monsanto oscillating disc rheometer described by Decker, Wise, and Guerry in Rubber World, December 1962, page 68. From the rheometer data, R.M.T. is the maximum torque in rheometer units, $t_3$ or $t_2$ is the time in minutes for a rise of three or two rheometer units, respectively, above the minimum reading and $t_{90}$ is the time required to obtain a torque 90% of the maximum.

The trademarks of some compounds used in the practice of this invention are Santocure MOR, Santoflex 77, Santocure NS, DPG, Thiofide, and Vultrol. Santocure MOR is the accelerator 2-(morpholinothio)benzothiazole. Santoflex 77 is the antidegradant N,N'-bis(1,4-dimethylpentyl)-p-phenylenediamine. Santocure NS is the accelerator N-tert-butyl-2-benzothiazolesulfenamide. DPG is the accelerator reported to be diphenylguanidine. Thiofide is an accelerator reported to be benzothiazyl disulfide. Vultrol is a vulcanization retarder reported to be N-nitrosodiphenylamine.

1,3-bis(phenylthio)-2-benzimidazolinone is an excellent premature vulcanization inhibitor. In an A–1 masterbatch, this compound increases the scorch delay 170% as shown in Table I.

An A–1 masterbatch is composed of—

| | Parts |
|---|---|
| Natural rubber | 100 |
| High abrasion furnace black | 50 |
| Stearic acid | 3 |
| Zinc oxide | 5 |
| Hydrocarbon softener | 3 |
| Total parts | 161 |

TABLE I

| | | |
|---|---|---|
| A-1 Masterbatch | 161.0 | 161.0 |
| Sulfur | 2.0 | 2.0 |
| Santocure MOR | 0.5 | 0.5 |
| 1,3-bis(phenylthio)-2-benzimidazolinone | | 1.0 |
| Santoflex #77 | 3.0 | 3.0 |
| Mooney Scorch at 121° C.: | | |
| $t_5$ | 24.3 | 65.8 |
| Percent Increase in Scorch Delay | | 170.0 |
| Rheometer at 144° C.: | | |
| R.M.T. | 56.0 | 53.7 |
| $t_3$ | 8.7 | 17.7 |
| $t_{90}$ | 19.5 | 29.5 |

Comparable results are obtained using the accelerator Santocure NS. 1,3-bis(cyclohexylthio)-2-benzimidazolinone shows a 411% increase in scorch delay over a natural rubber stock containing Santocure MOR alone. These results are calculated from Mooney Scorch Time $t_5$, at 121° C.

Some of the tests of this invention are carried out in an A–6 rubber masterbatch. An A–6 masterbatch is composed of the following:

| | Parts |
|---|---|
| Smoker sheets | 100 |
| High abrasion furnace black | 50 |
| Zinc oxide | 5 |
| Stearic acid | 3 |
| Hydrocarbon softener | 10 |
| Total parts | 168 |

Table II illustrates the useful premature vulcanization properties in an A–6 rubber masterbatch of N-(isopropylthio)phthalimide and N-(n-butylthio)phthalimide. The stocks contain 2.0 parts N-1,3-dimethylbutyl-N'-phenyl-p-phenylenediamine, 0.5 part Santocure MOR, and 2.5 parts sulfur.

TABLE II

| | | | |
|---|---|---|---|
| Control | | | |
| N-(isopropylthio)phthalimide | | 1.0 | |
| N-(n-butylthio)phthalimide | | | 1.0 |
| Mooney Scorch at 121° C.: | | | |
| $t_5$ | 12.9 | 37.4 | 37.8 |
| Percent Increase in Scorch Delay | | 189.0 | 193.0 |
| Rheometer at 144° C.: | | | |
| $t_2$ | 9.8 | 24.0 | 26.0 |
| $t_{90}$ | 27.0 | 47.5 | 45.0 |
| R.M.T. | 55.0 | 57.0 | 56.5 |
| $k_2$ | .138 | .130 | .128 |

In similar tests, N(-sec.-butylthio)phthalimide shows a 212% increase in scorch delay, and 1,3-bis(n-dodecylthio)benzimidazolinone shows a 52% increase in scorch delay.

1,3-bis(phenylthio)-2-benzimidazolinone or N-(phenylthio)succinimide are premature vulcanization inhibitors in cis-4-polybutadiene as shown in Table III. 1,3-bis-(phinylthio)-2-benzimidazolinone shows a 47% increase in scorch delay and N-(phenylthio)succinimide shows a 31% increase in cis-4-polybutadiene. The masterbatch for Table III is composed of:

| | Parts |
|---|---|
| Cis-4-polybutadiene | 100 |
| Aromatic extender and process oil | 8 |
| Stearic acid | 2 |
| Santoflex 77 | 3 |
| Zinc oxide | 3 |
| Intermediate super abrasion furnace black | 50 |

TABLE III

| | | | |
|---|---|---|---|
| Masterbatch | 166 | 166 | 166 |
| N-(phenylthio)succinimide | | 1.0 | |
| 1,3-bis(phenylthio)-2-benzimidazolinone | | | 1.0 |
| Santocure MOR | 0.6 | 0.6 | 0.6 |
| Sulfur | 2.4 | 2.4 | 2.4 |
| Mooney Scorch at 135° C.: | | | |
| $t_5$ | 15.5 | 20.3 | 22.8 |
| Percent increase in Scorch Delay | | 31.0 | 47.0 |
| Rheometer at 153° C.: | | | |
| R.M.T | 58.0 | 61.2 | 57.2 |
| $t_2$ | 7.6 | 8.6 | 9.8 |
| $t_{90}$ | 15.7 | 17.5 | 18.2 |

1,3-bis(phenylthio)-2-benzimidazolinone and N-(phenylthio)succinimide are premature vulcanization inhibitors in ethylene-propylene terpolymer as shown in Table IV. Ethylene-propylene terpolymer is the recognized and commonly used name for the polymerized product from the polymerization of ethylene-propylene and a small quantity of a nonconjugated diene. The terpolymer reported in Table IV is known commercially as "Nordel 1070." N-(phenylthio)succinimide shows a 28% increase in scorch delay and 1,3-bis(phenylthio)-2-benzimidazolinone shows an 80% increase when used as premature vulcanization inhibitors in ethylene-propylene terpolymer. The masterbatch of Table IV is composed of:

| | Parts |
|---|---|
| Ethylene-propylene terpolymer | 100 |
| High abrasion furnace black | 80 |
| Zinc oxide | 5 |
| Naphthenic-type oil plasticizer and softener | 40 |

TABLE IV

| | | | |
|---|---|---|---|
| Masterbatch | 225 | 225 | 225 |
| Tetramethyl thiuram monosulfide | 1.5 | 1.5 | .5 |
| Mercaptobenzothiazole | 0.5 | 0.5 | 0.5 |
| N-(phenylthio)succinimide | | 1.0 | |
| 1,3-bis(phenylthio)benzimidazolinone | | | 1.0 |
| Sulfur | 1.5 | 1.5 | 1.5 |
| Mooney Scorch at 135° C.: | | | |
| $t_5$ min | 10.9 | 14.9 | 20.5 |
| Percent increase in Scorch Delay | | 28.0 | 80.0 |
| Rheometer at 160° C.: | | | |
| R.M.T | 63.5 | 60.0 | 58.0 |
| $t_2$ | 4.6 | 6.0 | 7.5 |
| $t_{90}$ | 11.7 | 15.2 | 17.5 |

1,3-bis(o-nitrophenylthio)-2-benzimidazolinone shows a 57% increase in scorch delay in an A–6 masterbatch The results are in Table V.

TABLE V

| | | |
|---|---|---|
| A-6 Masterbatch | 168 | 168 |
| Santoflex 77 | 3.0 | 3.0 |
| Santocure MOR | 0.5 | 0.5 |
| Sulfur | 2.5 | 2.5 |
| 1,3-bis(o-nitrophenylthio)-2-benzimidazolinone | | 1.0 |
| Mooney Scorch at 121° C.: | | |
| $t_5$ min | 22.8 | 35.9 |
| Percent Increase in Scorch Delay | | 57.0 |
| Rheometer at 144° C.: | | |
| R.M.T | 68.0 | 66.2 |
| $t_3$ | 8.1 | 12.2 |
| $t_{90}$ | 20.8 | 20.5 |

Comparable results are obtained with the inhibitor 1,3-bis(chlorophenylthio)-2-benzimidazolinone.

An ortho-, meta-, and para-mixture of 1,3-bis(tolylthio)-2-benzimidazolinone gives a 163% increase in scorch delay over the control, and 1,3-bis(m-tolylthio)-2-benzimidazolinone increases the delay 142%. These data are shown in Table VI.

TABLE VI

| | | | |
|---|---|---|---|
| A-6 Masterbatch | 168 | 168 | 168 |
| Santoflex 77 | 3.0 | 3.0 | 3.0 |
| Santocure MOR | 0.5 | 0.5 | 0.5 |
| Sulfur | 2.5 | 2.5 | 2.5 |
| o,m,p-Mixture of 1,3-bis(tolylthio)-2-benzimidazolinone | | 1.0 | |
| 1,3-bis(m-tolylthio)-2-benzimidazolinone | | | 1.0 |
| Mooney Scorch at 121° C.: | | | |
| $t_5$ min | 22.7 | 59.8 | 54.9 |
| Percent Increase in Scorch Delay | | 163.0 | 142.0 |
| Rheometer at 144° C.: | | | |
| R.M.T | 56.9 | 56.3 | 57.0 |
| $t_3$ | 8.8 | 17.5 | 16.2 |
| $t_{90}$ | 20.2 | 29.0 | 27.5 |

The ortho-, meta-, and para-mixture of 1,3-bis(tolylthio)-2-benzimidazolinone was tested in a B–5 masterbatch of styrene-butadiene rubber. A 113% increase in scorch delay over the control is obtained with an accelerator mixture of DPG and Thiofide and the inhibitor. The inhibitor gives an 80% increase in scorch delay when used with Santocure NS in styrene-butadiene rubber. These results are shown in Table VII below.

A B–5 masterbatch is composed of:

| | Parts |
|---|---|
| Oil-extended styrene-butadiene rubber containing 37.5% highly aromatic oil | 137.5 |
| Intermediate super abrasion furnace black | 68.5 |
| Zinc oxide | 3.0 |
| Stearic acid | 2.0 |

TABLE VII

| | | | | |
|---|---|---|---|---|
| B-5 Masterbatch | 211 | 211 | 211 | 211 |
| Thiofide | 1.4 | 1.4 | | |
| DPG | 0.7 | 0.7 | | |
| Santocure NS | | | 1.4 | 1.4 |
| N-1,3-dimethylbutyl-N'-phenyl-p-phenylenediamine | 2.0 | 2.0 | 2.0 | 2.0 |
| o,m,p-Mixture of 1,3-bis(tolylthio)-2-benzimidazolinone | | 1.0 | | 1.0 |
| Sulfur | 1.7 | 1.7 | 1.7 | 1.7 |
| Mooney Scorch at 135° C.: | | | | |
| $t_5$ min | 10.3 | 22.3 | 23.3 | 41.8 |
| Percent Increase in Scorch Delay | | 113.0 | | 80.0 |
| Rheometer at 153° C.: | | | | |
| R.M.T | 54.0 | 46.0 | 52.5 | 46.2 |
| $t_2$ | 4.5 | 9.3 | 10.2 | 15.3 |
| $t_{90}$ | 11.5 | 17.8 | 21.3 | 27.8 |

Comparable results to those in the tables, supra, illustrating utility are obtained with the inhibitors of this invention which are not illustrated. Results comparable to the rubber preparations of the tables, supra, are obtained using cis-4-polybutadiene, butyl rubber, oil-extended styrene butadiene rubber, ethylene-propylene terpolymers, polymers of 1,3-butadiene, for example, 1,3-butadiene itself and of isoprene and copolymers of 1,3-butadiene with other monomers, for example, styrene, acrylonitrile, isobutylene, and methyl methacrylate.

Concentration studies show the inhibitors of this invention are effective in rubber at concentrations of 0.05 to 5.0 parts per hundred. Concentrations from 0.25 to 3.0 parts per hundred are preferred.

It is intended to cover all changes and modifications of the examples of this invention herein chosen for purposes of disclosure which do not constitute departures from the spirit and scope of the invention.

We claim:
1. A compound of the formula

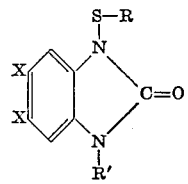

wherein R is alkyl of 1 to 18 carbon atoms, cycloalkyl of 5 to 12 carbon atoms, benzyl, unsubstituted aryl of 6 to 10 carbon atoms, or substituted aryl of 6 to 10 carbon atoms where the substituents are alkyl of 1 to 18 carbon atoms, alkoxy of 1 to 18 carbon atoms, nitro, chloro, bromo, fluoro, iodo, or hydroxy, R' is hydrogen or RS-, R having the same significance as before, and X is hydrogen, alkyl of 1 to 18 carbon atoms, alkoxy of 1 to 18 carbon atoms, nitro, chloro, bromo, fluoro, iodo, or hydroxy.

2. A compound according to claim 1 wherein R is phenyl, R' is hydrogen, and X is hydrogen.

3. A compound according to claim 1 wherein R is cycloalkyl of 5 to 8 carbon atoms, R' is cycloalkylthio of 5 to 8 carbon atoms, and X is hydrogen.

4. A compound according to claim 3 wherein R is cyclooctyl, R' is cyclooctylthio, and X is hydrogen.

5. A compound according to claim 3 wherein R is cyclohexyl, R' is cyclohexylthio, and X is hydrogen.

6. A compound according to claim 3 wherein R is cyclopentyl, R' is cyclopentylthio, and X is hydrogen.

7. A compound according to claim 1 wherein R is alkyl of 3 to 12 carbon atoms, R' is alkyl thio of 3 to 12 carbon atoms, and X is hydrogen.

8. A compound according to claim 7 wherein R is isopropyl, R' is isopropylthio, and X is hydrogen.

9. A compound according to claim 1 wherein R is benzyl, R' is benzylthio, and X is hydrogen.

10. A compound according to claim 1 wherein R is chlorophenyl, R' is chlorophenylthio, and X is hydrogen.

11. A compound according to claim 10 wherein R is phenyl, R' is phenylthio, and X is hydrogen.

12. A compound according to claim 10 wherein R is tolyl, R' is tolylthio, and X is hydrogen.

13. A compound according to claim 1 wherein R is cyclo-dodecyl, R' is cyclododecylthio, and X is hydrogen.

14. A compound according to claim 1 wherein R is cyclohexyl, R' is hydrogen, and X is hydrogen.

References Cited

UNITED STATES PATENTS 3,249,620   5/1966   Kuhle et al. _____ 260—309.2

OTHER REFERENCES

Sawlewicz et al., Chem. Abst., vol. 61, column 16062 (Dec. 21, 1964).

Zinner et al., Chem. Ber., vol. 91, pp. 1436–7 (1958).

NORMAN S. MILESTONE, *Primary Examiner.*

N. TROUSOF, *Assistant Examiner.*

U.S. Cl. X.R.

260—79.5, 80.78, 83.3, 83.5, 85.1, 85.3, 94.7, 326, 326.5, 780